June 8, 1943.                H. J. BYRNE                2,321,455
              AUTOMATIC MACHINE SPEED CONTROL MECHANISM
                  Filed Nov. 7, 1939            2 Sheets-Sheet 1

Fig.1.

INVENTOR.
HUGH J. BYRNE
BY [signature]
ATTORNEY.

June 8, 1943.  H. J. BYRNE  2,321,455
AUTOMATIC MACHINE SPEED CONTROL MECHANISM
Filed Nov. 7, 1939  2 Sheets-Sheet 2
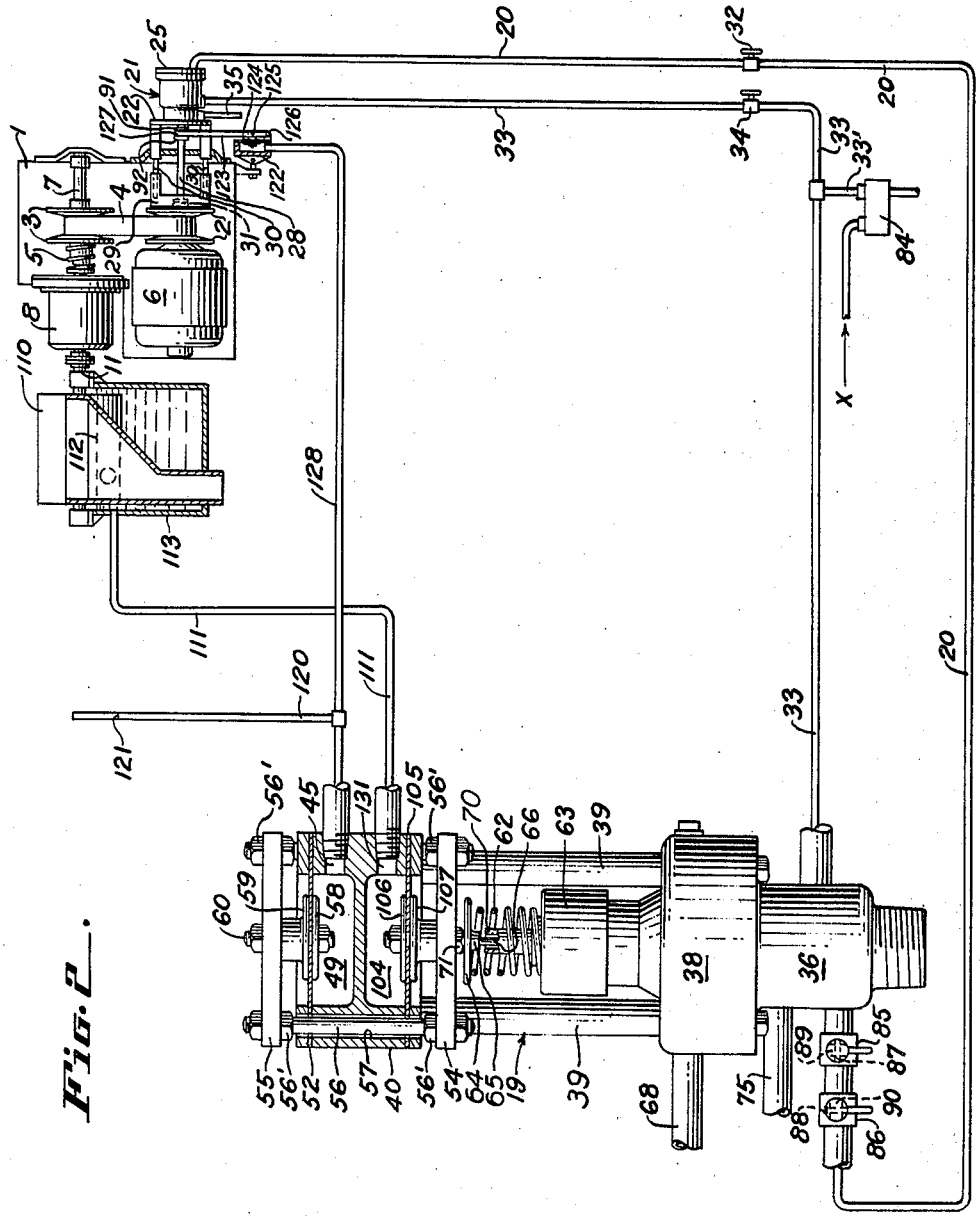
INVENTOR.
HUGH J. BYRNE
BY
ATTORNEY Patented June 8, 1943

2,321,455

UNITED STATES PATENT OFFICE 2,321,455

AUTOMATIC MACHINE SPEED CONTROL MECHANISM

Hugh J. Byrne, Oakland, Calif.

Application November 7, 1939, Serial No. 303,250

8 Claims. (Cl. 74—230.17)

This application is a continuation in part of my parent co-pending patent application Serial No. 125,822, filed February 15, 1937, which will be issued on December 5, 1939, as Patent No. 2,182,310.

The invention herein relates to the automatic regulation of the speeds of machines in general, and the principal object of the invention is to provide improved automatic means for regulating or controlling the speeds of industrial equipment through the intermediary of a Reeves variable speed transmission or equivalent mechanical speed varying device having a shiftable controlling element. A further object of the invention is to provide means for the purpose above set out which will provide for changing the controlled speed of the driven machine, or piece of equipment, from a remote point. A further feature is the provision of a fluid-operated speed indicator at the same or other remote point.

A still further object is to provide automatic means of varying the controlled result in desired relation to the speed of the mechanism for attaining said controlled result. Other objects are reliability of performance, simplicity of construction and low cost of equipment compared to the cost of prior apparatus for similar purposes. Other objects and/or advantages of the invention will appear in the following specification and accompanying drawings.

In the drawings:

Figure 1 is a schematic plan showing a variable speed transmission for operating a conveyor; the purpose of the invention being to maintain a fixed transmission speed ratio and accomplishing this result from a remote point at which point the speed ratio can be varied at will and further the speed ratio can be indicated or the resultant transmission output speed, dependent upon said ratio, can be indicated. Discussion of detail shown on Figure 1 will be given below, which detail is exactly the same as that shown in Figure 4 of application Serial No. 125,822.

Figure 2 is a schematic plan showing a variable speed transmission for operating the perforated drum of a rotary filter; the purpose of the invention being to maintain a fixed transmission speed ratio for any controlled liquid level condition in the rotary filter and to accomplish this result from a remote point and at which point the speed ratio can be varied. Discussion of detail shown in Figure 2 will be given below, which detail is a rearrangement or regrouping of exact details shown in Figures 2, 3 and 4 of application Serial No. 125,822.

Before describing the invention in detail it may be stated that many types of industrial machinery are driven through the intermediary of a variable speed transmission, that probably the most common of such transmissions is the "Reeves variable speed transmission" and for which, together with similar transmissions having a shiftable speed changing element, the invention is primarily concerned.

The variable speed transmission comprises a frame 1 with two pairs of confronting cone pulleys 2 and 3 rotatably mounted on the frame, each pair respectively on the driving and driven shaft, and the pulleys connected by a special beveled edge belt 4, the arrangement being such as to permit the pulleys of each pair to open and close, that is those of each pair can approach each other axially on their respective shafts, to force the belt to ride at different cone diameters depending upon the spacing of the pulleys of each pair, the usual construction providing hand-operated means, not shown, for opening and closing one pair of pulleys, and a spring 5 acting on the other pair of pulleys 3 forcing them to assume the proper position to accommodate the particular cone diameter where the belt is riding on the pulleys. Some of the models have a leverage arrangement for positively closing one pair of pulleys proportionately as the other pair is opened from the same leverage system.

The present invention automatically operates the pulleys under control of some output function of the machine to be driven, or of the work to be done.

In the drawings my apparatus is operatively connected for shifting the driving pulleys 2, although it may operate either or both pair, depending upon the particular construction of the variable speed transmission, and the driving pulleys, or rather the shaft upon which they are mounted (not shown) is driven by any source of mechanical power, generally a motor 6, and a driven pulley shaft 7, which may extend through a set of reduction gears in a casing 8, and which may or may not incorporate a suitable clutch for disconnecting the driven machine from the driven shaft of the variable speed transmission if desired.

In Figure 1 the driven machine is a belt conveyor 9 passing over a driving pulley 10 mounted on a shaft 11 which is connected to the reduction gears on the variable speed transmission output shaft or driven shaft 7, as may be desired.

The pulley of the pair 2 nearest the motor 6 revolves at substantially constant speed in one plane, or in other words it is not moved axially. The other pulley of this pair is arranged to be moved axially, and obviously as it is moved toward the motor 6 the output speed of the transmission and that of the conveyor 9 is increased. A servo-motor hydraulic cylinder 21 is firmly mounted on the transmission case by a suitable bracket 22 in such a manner that it and the cone pulleys 2 have a common axis. Cylinder 21 is really two cylinders of different diameters, or one casting bored out to form an inner cylinder 23 with a larger cylinder 24 extending outwardly therefrom and closed by a cylinder head 25. The smaller and larger cylinders are provided with nicely fitted pistons 26 and 27 respectively, of any approved design, including the usual cup leathers or sealing rings, spacedly secured to a common piston rod 28 which is secured at its inner end to a yoke 29 slidably supported on two guides 30, which yoke engages a suitable anti-friction collar 31 on the outer of pulleys 2 for sliding this pulley back and forth as the pistons are moved outward and inward respectively in their cylinders. The position of the slidable pulley 2 and likewise the speed of the conveyor 9 is varied through the action of the pilot valve 19 which controls fluid flow through pipes 20 and 33. Pipe 20 enters the outer end of the large diameter cylinder 24 through cylinder head 25 and may be conveniently provided with a shut-off valve 32. Pipe 33 enters the small diameter cylinder 23 at its outer end and this line may also be conveniently provided with a shut-off valve 34. Cylinder 23 is also provided with a drain pipe 35 to carry away any seepage which may get past piston 26. With the construction of the two diameter cylinder 21 having the two different sized pistons in it as described, a differential piston is provided so that with fluid at the same pressure supplied to both cylinders through pipes 20 and 33, the piston assembly, yoke 29, and outer pulley 2 would move inward or to the left in Figure 1 (by reason of the greater area of the piston in the outer cylinder), to thereby move the pair of cone pulleys 2 closer together, and force the belt 4 to ride at a larger diameter on these pulleys while at the same time reduce the diameter of the pulleys 3 where the belt 4 is in contact with same and thus increase the speed of the driven shaft 7 and conveyor 9.

If the fluid pressure in the outer end of cylinder 24 is lowered by any means to a point where the force on the right side of piston 27 is less than the differential force tending to move the piston assembly to the right, which differential force is the result of the full supply pressure being between pistons 26 and 27 at all times and the difference in area between these two pistons, the assemblage including the outer of cone pulleys 2 will move outward and thereby reduce the speed of the driven shaft 7 and conveyor 9.

By the use of two different sized pistons secured to one piston rod and working in a cylinder having differential bores as described, the necessity for stuffing boxes on the piston rod is avoided thereby eliminating a factor which could affect sensitiveness and response of control through friction. This system also makes it possible to use a two-way pilot by which displacement of the piston assembly is produced through controlling fluid flow in pipe line 20, pipe line 33 always carrying uncontrolled supply pressure. Actually the pilot valve does control fluid flow in pipe line 33 because fluid must necessarily flow out of the small diameter cylinder 23 when the pilot valve causes fluid to flow into the large diameter cylinder 24 through pipe line 20.

The length of stroke of the piston assembly and consequent movement of the cone pulleys in either direction may be limited by stopnuts 91 and 92 to adjustably vary the speed range of the transmission.

In practice uncontrolled fluid pressure, from a reasonably constant pressure source, is maintained in pipe 33, through branch pipe 33', from any desired source X and the pressure in pipe 20 is varied through the action of the automatic pilot which is influenced by the pressure in diaphragm chamber 114 (resulting from the liquid leg in stand pipe 120) and the compression loading of spring 62. The fluid source X is cleansed of foreign matter by passing through a filter, or strainer 84, before passing through branch pipe 33' principally to prevent fouling the orifices of the pilot valve which will be discussed below.

The pilot 19, shown enlarged in the drawings, comprises a suitably supported fixed body, generally located at the desired remote control point, although it may be close to the variable speed transmission if desired. The body is made of several pieces 36, 37, 38, 39 and 115 suitably secured together and formed to provide the several threaded ports 41, 42, 43, 44 and 131' and chambers 41', 46, 47, 48 and 114 as shown, and with flexible (preferably rubber fabric) diaphragms 50 and 51, separating chamber 47 from chambers 46 and 48, and a similar diaphragm 116 closing the lower side of chamber 114.

The chamber 114 is connected to an expansible chamber 122 through pipe 123 so that liquid can be drawn from or sent to stand pipe 120 by displacement of the shiftable or outer of the pair of pulleys 2 to change the pressure in chamber 114 in a manner described below. The height of liquid 121 in the stand pipe 120 being a function of the displacement of the transmission shiftable pulley is, therefore, also a function of the speed of conveyor 9 and can be so indicated by graduation on a glass tube as shown.

Chamber 114 is a part of diaphragm chamber head 115 which is fixedly supported on uprights 39 and together with the ring on the bottom of same, clamping diaphragm 116 in a fixed position, forms a seal for chamber 114. Washers 117 and 118 are clamped to the center of diaphragm 116 by means of bolt 71' the head of which is rounded and bears against the top of a flat flange 64, being so constructed to eliminate the necessity of securing perfect alignment with needle valve 66 when operating same. A compression spring 62 is provided reacting between an adjusting nut 63 and the lower side of flange 64 secured to or formed on the upper enlarged portion 65 of the needle valve 66, and which needle valve is adapted to more or less close a relief passage 67 leading from chamber 48 to port 44 and waste pipe 68. The structure includes, for purposes of construction, securely aligned nipples 69 and 70 for facilitating alignment of the relief passage 67 with needle valve 66. Where close alignment is necessary it has been provided, but wherever possible the structure has been made to eliminate the necessity of close alignment. However, the foregoing details of construction may be varied considerably.

With the arrangement described it will be seen that any variation of pressure in chamber 114 due to displacement of the transmission shiftable pulley will at once react against diaphragm 116 and the resultant force on same opposed by the compression spring 62 will vary the elevation of the needle valve 66. Accordingly, by the arrangement described there is provided a self-contained liquid pressure or fluid pressure system having a fixed quantity of liquid or fluid therein extending from the variable speed transmission to the pilot arranged to influence the latter in controlling the speed of the variable speed transmission.

Port 41 connects to pipe 20 from the larger bore of cylinder 21, while port 42 connects to pipe 33 from the smaller bore of cylinder 21 and communicates with a chamber or extension 41' of port 41 through a small restricted passage or orifice 72 in a threaded nozzle 73. Chamber 41' communicates by way of a small passage 74 with port 43 through chamber 46 to waste pipe 75, and passage 74 is beveled outwardly at its upper end and surmounted with a loose or floating conical valve 76 which may be forced downward to more or less close the passage 74 upon downward flexing of diaphragms 50 and 51 which are clamped firmly at their margins to the pilot structure 36, 37, and 38 and which are also clamped at their centers by washers 77 and 78, the latter of which may be the head of a bolt 79 which passes through a tapered spacer 80, so that the diaphragms will flex together when the pressure is varied above diaphragm 51.

Extending from port 42 is a small passage 81 which continues through the clamped margins of both diaphragms 50 and 51 as indicated and connects with chamber 47 and also connects through a restricted passage or orifice 82 in a threaded nozzle 83 with chamber 48.

To definitely limit the speed of shifting the transmission shiftable pulley 2 by the hydraulic cylinder 21, one or more service cocks 85 and 86 with plugs having a different fixed size restricted opening 87 and 88, may be included in pipe 20, each plug also having a large bore 89 and 90, equal to the maximum capacity desired for pipe 20. Thus by simply throwing either plug to bring its restricted opening in line with the pipe and the other with its large opening in line with the pipe the desired speed of operation of the control may be had without the use of needle valve adjustment which is uncertain and objectionable.

From chamber 48 fluid can flow past the needle valve 66 at a rate dependent upon its approach to the opening at the top of nipple 69 and if liquid is used it will flow out through waste pipe 68. Chamber 47 is always open to full supply pressure of the liquid or fluid as the case may be. Chamber 41' leads back through port 41, pipe 20 and cocks 85 and 86 to the outer end of large diameter cylinder bore 24 and also by way of passage 74 past floating valve 76 to waste pipe 75. The pressure in the large diameter cylinder 24 will therefore depend upon the opening of valve 76 as it controls a fluid outlet that is of far greater cross section than that of restricted inlet orifice 72, and when valve 76 is fully open the pressure in chamber 41', pipe 20 and cylinder 24 (between piston 27 and cylinder head 25) can drop to almost zero thereby causing outward movement of the piston assembly and diminishing speed of conveyor 9. Actually a complete reversal in piston assembly movement can be accomplished on a small change of pressure in chamber 41'.

As previously mentioned the pressure in chamber 114 reacting against compression spring 62 controls the degree of opening of needle valve 66 (which is never quite closed) and thereby varies the pressure in chamber 48 and its effect upon diaphragm 51. Full pressure being always maintained in chamber 47, from passage 81, produces a constant upward force on plug 80 due to the difference of the areas of diaphragms 50 and 51 that is exposed to fluid pressure in chamber 47, and if the pressure in chamber 48 falls to a value approximating one-half of the pressure in chamber 47, as it would when needle valve 66 is raised, disc 78 rises and permits floating valve 76 (preferably made of hard rubber or similar material) to rise, and thereby reduce the pressure in chamber 41' to a minimum causing outward movement of the piston assembly and diminishing speed of conveyor 9, as explained above, and occurring when the compression spring 62 upward thrust is greater than the downward load on diaphragm 116 from pressure in chamber 114. If the pressure in chamber 114 is such that it results in a greater downward load on diaphragm 116 than the upward thrust of spring 62 the needle valve 66 will be depressed restricting the flow through orifice 67 which will raise the pressure in chamber 48 and overcoming the normal upward thrust on plug 80 (explained above) cause the plug, discs 77 and 78, center portions of diaphragms 50 and 51 and the floating needle 76 to move downward to restrict the flow from orifice 74. This results in an increased pressure in chamber 41' which is transmitted by line 20 to cylinder 24 causing the piston assembly to move inward and increase the speed of conveyor 9.

Orifice 74 and floating needle 76 are very inexpensive and when the cost of fluid used is a factor they can be replaced by a two-way slide valve (which has a negligible waste) that can be moved vertically downward by disc 78 to open a supply port in a sleeve fixed in chamber 41' while holding an exhaust port on the same sleeve closed to cause fluid to flow to cylinder 24 and conversely when disc 78 is raised it would permit the slide valve to rise and fluid to return from cylinder 24 by the supply port being closed and the exhaust port being opened. With such an arrangement orifice 72 would not be used, supply line 33 would feed fluid to the base of the slide valve and sleeve, and line 20 would connect through body 36 to the sleeve at any point between the sleeve ports, the upper port being the exhaust and the lower port being the supply port. Supply pressure would tend to lift the slide valve and this upward force could be assisted by a small spring at the base of the slide valve.

The above arrangement would eliminate the continuous flow of fluid through orifice 74 by replacing a friction-free valve 76 with an equivalent valve in result but one that would not be friction-free. However, friction in such a valve is of no consequence due to the relatively great operating force afforded by diaphragm 51 and the continued use of a friction-free primary source of control, namely; the needle 66 which has a very loose fit in its guide piece 70. In practice the needle valve 66 is always riding on a small jet of liquid or fluid issuing from orifice 67 and the actual movement up and down is only about .003".

By the action described the speed of the conveyor 9 will be very accurately controlled for all upward thrust loads of spring 62 as adjusted remotely by nut 63.

As stated in the foregoing chamber 114 is connected to an expansible chamber 122 through pipe 128 so as to vary the pressure in chamber 114 by varying the height of the liquid 121 in stand pipe 120, that extends vertically upward from chamber head 115, upon movement of the shiftable or outer of pair of cone pulleys 2. The stand pipe 120 is vented to atmosphere at its upper end and contains a high enough column of water or oil 121 to give the maximum liquid pressure desired in chamber 114 to balance spring 62. The effective head or pressure of the liquid is automatically varied upon any adjustment of the spring until the balance is reestablished to maintain the speed constant at the adjusted rate as follows:

The variation in head of liquid in the tube is carried out by means of a relatively large expansible chamber 122 connected to the liquid column of tube 120 by a pipe 128 and the chamber is conveniently secured to the frame 1 of the "Reeves" and operated by a pivoted lever 123 moved back and forth by longitudinal movement of the piston rod or shaft 28.

The expansible chamber 122 which may be a metal bellows, or a piston, is here shown as a cylindrical chamber closed on one side by a large flexible diaphragm 124 to the center of which the end of the lever is pivotally connected at 125. The lever is fulcrumed at 126 to the margin of the chamber and the longer or free end of the lever is yoked to a collar on the rod 28 as indicated at 127 so that it will follow the motions of the rod 28 in opening and closing Reeves pulleys 2.

By this means, to change the speed of the Reeves, say to increase it, adjusting nut 63 is screwed down somewhat, thereby slacking off on the upward force of compresison spring 62 against diaphragm 116 and thus increasing the effective head or pressure of the standing column of liquid 121 in chamber 114 and thereby forcing the needle valve 66 to close slightly. This at once builds up increased pressure in pipe 20 as explained above, and moves rod 28 toward the left and closes pulleys 2 somewhat to increase the speed of the Reeves and conveyor driven thereby.

This motion of rod 28 would keep up until stopped by some other function of the apparatus. However, as rod 28 moves to the left, it carries the long end of lever 123 with it and pulls diaphragm 124 outward to expand chamber 122 and thereby draws more liquid from pipe 128 into it to quickly drop the column in tube 120 to a point where it permits the needle valve to rise again slightly to the neutral point, or where valve 76 is just open sufficiently to pass the water from orifice 72 without there being any flow in either direction in pipe 20 and hence holding the piston assembly in cylinders 21 locked.

It will be evident that instead of using the open variable stand pipe 120, to change the pressure in chamber 114, fitting 129 may be closed at 130 and a gas under pressure used in pipe 128 which gas pressure would be varied as the expansion chamber 122 was expanded or contracted. A dial type pressure gauge could be attached at 130 and graduated to indicate speed similar to the graduations on stand pipe 120.

Figure 2 is a schematic plan showing a variable speed transmission for operating the perforated drum 110 of a rotary filter employing the same pilot valve as in Figure 1 except with a double pressure chamber type of head exactly the same as the Figure 2 pilot of application Serial No. 125,822, and the same expansible chamber as shown in Figure 1 of this application and in Figure 4 of application Serial No. 125,822, except that i is rotated 180° so that the volume of the expansible chamber decreases as the transmission output speed increases instead of its volume increasing as the transmission output speed increases. The action of the expansible chamber acts exactly the same as in Figure 1 in that whenever the thrust of compression spring 62 is changed by adjusting nut 63 the pilot forces the piston assembly in power cylinder 21 to move to such a position as will restore the pilot in neutral and thereby fix the position of the piston assembly. For instance, referring to Figure 1, if the nut 63 is screwed downward to lessen the thrust of compression spring 62, the piston assembly will move inward increasing the volume of the expansible chamber 122 which restores the pilot in neutral as explained above; referring to Figure 2 if the compression spring thrust is similarly lessened, the piston assembly will move inward but decreases the volume of the expansible chamber 122 to restore the pilot in neutral in a manner fully described in the following. Since, with the exception of the pilot head construction, the pilot of Figure 2 is identical to that of Figure 1 all similar parts of the pilot and variable speed transmission are designated by the same numerals used in Figure 1 and only those parts that are at variance therewith bear new numbers. The variable speed transmission is the same as in Figure 1 except that it drives a rotating perforated drum 110 instead of a conveyor drum 10 by shaft 11. As shown, drum 110 is supported at the top of the filter tank 113 on suitable bearings in an aqueous mixture. Means, not shown, withdraw filtered liquid out of the inside of the rotating perforated drum and the solid matter is scraped off of the periphery of the drum which solid matter passes through a chute to a collecting or disposal system. A pipe 111 leads from a point below the lowest desired liquid level 112 and extends to port 131 of pressure chamber 104, the lower of a double pressure chamber pilot head 40. The stand pipe 120 and balancing line 128 from expansible chamber 122 is connected through port 45 to pressure chamber 49, the upper of the double pressure chamber head 40 which chamber is fixedly supported on uprights 39. A means of providing vertical movement through head 40 consists of a pair of plates 54 and 55 and spaced bolts 56 which are slidable in vertical openings 57 in member 40, the travel being limited by nuts 56' on bolts 56. Plates 54 and 55 are secured to diaphragm 52 by clamping washers 58 and 59 and bolt 60 and to diaphragm 105 by clamping washers 106 and 107 and bolt 71 the head of which is rounded and bears against the top of a flat flange 64 being so constructed to eliminate the necessity of securing perfect alignment with needle valve 66 when operating same. The cycle of increasing the output speed of the transmission by downward movement of needle 66 and decreasing the output speed by raising needle 66 has been explained in the discussion of Figure 1 and as it is identical for Figure 2 it will not be repeated.

It will be noted that the pressure in chamber 104, resulting from the height of the liquid 112 in tank 113, transmitted by line 111, tends to move the yoke assembly 54, 55 and 56 downward while the pressure in chamber 49 resulting from the height of the liquid 121 in stand pipe 120, and varied by the volume of expansible chamber 122, tends to move the yoke assembly upward as also does the compression spring 62. As the spring assists the pressure in chamber 49 to raise the yoke assembly the height of the liquid 121 must always be lower than the liquid level 112 when liquid is used in standpipe 120 (instead of a gas) and assuming both liquids are of like specific gravity. This is also predicated on the yoke assembly being of negligible weight.

Considering any set of liquid levels in stand pipe 120 and tank 113 if adjusting nut 63 is screwed downward to lessen the thrust of compression spring 62, the pressure in chamber 104, resulting in a greater downward thrust on the yoke assembly than the combined upward thrust of spring 62 and that due to the pressure in chamber 49, will depress needle 66 to start moving the piston assembly 26, 27 and 28 inward to increase the output speed of the transmission and the filter drum 110. Simultaneously, the end of lever 123 that is attached to a collar on piston rod 28 at 127 moves inward thereby decreasing the volume of the expansible chamber 122 as the lever 123 is fulcrumed at 126 to the margin of the expansible chamber 122 and is pivotally connected at 125 to the center of a large flexible diaphragm 124 which is fixed at its margin to expansible chamber 122. The resultant decrease in the volume of expansible chamber 122 moves liquid therefrom into stand pipe 120 via line 128 to increase the pressure in chamber 49 and the cycle continues until the resultant increase in upward thrust on the yoke assembly, due to rising pressure in chamber 49, is equal to the decrease in compression spring thrust made at the start of the cycle. If the upward thrust of compression spring 62 is increased, the transmission speed is decreased and, upon increasing the volume of the expansible chamber 122, the pilot is restored to neutral. When equilibrium has been attained, the pilot fixes the position of the piston assembly 26, 27 and 28.

Considering any set of liquid levels in standpipe 120 and filter tank 113, when the pilot is in neutral (fixing the position of the piston assembly in the servo-motor hydraulic cylinder 21) and a state of equilibrium exists in the filter tank 113 (that is the rate of filtration accomplished by perforated drum 110 is equal to the rate of in-flow of material to tank 113 to be filtered) if the rate of in-flow to tank 113 increases, the liquid level 112 will increase. This will produce a rising pressure in chamber 104, which, through the pilot action explained in the foregoing, will increase the output speed of the variable speed transmission and the speed of filter drum 110. As the output speed of the variable speed transmission increases, the volume of the expansible chamber 122 decreases, thereby causing fluid to flow therefrom through pipe 128 and into standpipe 120 to raise therein the liquid level 121. Such a rise of liquid level 121 will obviously increase the pressure in chamber 49. The output speed of the variable speed transmission will continue to increase until, by the simultaneous decrease in volume of expansible chamber 122, the pressure in chamber 49 raises the yoke assembly 54, 55 and 56 to reposition the pilot 19 in neutral and fix the position of the piston assembly in cylinder 21. When, by the action of expansible chamber 122, the pilot 19 has been restored to neutral, the difference in liquid levels 112 and 121 will be exactly the same as the difference between these two levels at the start of the cycle discussed herein. On the other hand, if the rate of in-flow to filter tank 113 suddenly decreases, causing a lowering of liquid level 112, the pressure in chamber 104 will obviously decrease. This, of course, causes a decrease in the speed of the filter drum 110 and by the outward movement of the piston assembly in cylinder 21 to produce such a decrease in speed, the volume of the expansible chamber 122 is increased and this will lower the liquid level 121 to eventually reduce the pressure in chamber 49 to restore the pilot 19 to neutral. When this condition has been established, the difference in liquid level between 112 and 121 will be exactly the same as the difference between these levels at the beginning of the cycle discussed herein. Accordingly, as the rate of in-flow to the filter tank 113 increases, the controlled result, or liquid level 112, will rise as the speed of the filter drum 110 increases to increase the rate of filtration.

Having thus described my improved control for equipment driven by a variable speed transmission of the Reeves type and some of the various arrangements it may take, it will be evident that it will also operate on other speed reducing devices provided with a member for moving back and forth to change the speed, which may be operated pneumatically or hydraulically by the shifting arrangement shown in the drawings. Further, the use of a liquid in cylinders 23 and 24 provides a definite locked position of the shaft or pulley shifting rod 28 and insures against any change in adjustment of pulleys 2 until moved by pilot action; yet a gas, such as air, might be used instead of a liquid where inferior results would satisfy. Hence, any use of air or gas in place of the hydraulic means shown and described herein is to that extent intended to be covered as an inferior substitute in the appended claims where use of the words hydraulic and liquid are employed.

I claim:

1. Means for controlling a variable speed transmission having a shiftable element for changing its speed which comprises providing an hydraulic piston operatively connected to said element for shifting the same, means for admitting a liquid under pressure to and for operating said piston, a pilot arranged and adapted for controlling the flow of liquid to and from said piston, a liquid pressure line extending to said pilot and forming a standing liquid column above the same arranged to influence the pilot in controlling said flow, and means for varying the height of said column upon movement of said piston.

2. Means for controlling a variable speed transmission having a shiftable element for changing its speed which comprises providing an hydraulic piston operatively connected to said element for shifting the same, means for admitting a liquid under pressure to and for operating said piston, a pilot arranged and adapted for controlling the flow of liquid to and from said piston, a liquid pressure line extending to said pilot and forming a standing liquid column above the same arranged to influence the pilot in controlling said flow, and means for varying the height of said column comprising an expansible chamber connected to said line, a lever connected to said chamber and arranged to be moved back and forth with the movement of said piston.

3. Means for controlling a variable speed transmission having a shiftable element for changing its speed which comprises providing a servo-motor operatively connected to said element for shifting the same, means for admitting a fluid under pressure to and for operating said servo-motor, a pilot arranged and adapted for controlling the flow of fluid to and from said servo-motor, a self-contained fluid pressure system having a fixed quantity of fluid under pressure therein extending to said pilot arranged to influence the same in controlling said flow, and means for varying the fluid pressure in said system upon movement of said servo-motor.

4. In the structure set out in claim 3, the last mentioned means comprising an expansible chamber forming a part of said fluid pressure system expanded and contracted by movement of said element.

5. Means for controlling a variable speed transmission having a shiftable element for changing its speed which comprises providing an hydraulic piston operatively connected to said element for shifting the same, means for admitting a liquid under pressure to and for operating said piston, a pressure responsive pilot valve arranged and adapted for controlling the flow of liquid to and from said piston, pressure applying means extended to said pilot arranged to influence the pilot in controlling said flow, and means operated by direct connection from said piston for varying the pressure applied to said pilot valve upon movement of said piston whereby the pressure applied to said pilot valve is progressively increased or decreased as the piston is moved from one of its extreme positions to the other.

6. Means for controlling a variable speed transmission having a shiftable element for changing its speed which comprises providing a servo-motor operatively connected to said element for shifting the same, means for admitting a liquid under pressure to and for operating said servo-motor, a pressure responsive pilot valve arranged and adapted for controlling the flow of liquid to and from said servo-motor, pressure applying means extended to said pilot arranged to influence the pilot in controlling said flow, and means operated by direct connection from said element for varying the pressure applied to said pilot valve upon movement of said servo-motor whereby the pressure applied to said pilot valve is progressively increased or decreased as the shiftable element is moved from one of its extreme positions to the other.

7. Means for controlling a variable speed transmission having a shiftable element for changing its speed which comprises an hydraulic piston operatively connected to said element for shifting the same, means for admitting a liquid under pressure to and for operating the piston, a pilot arranged and adapted for controlling the flow of liquid to and from said piston, a fluid pressure system extending to said pilot and arranged to influence the pilot in controlling said flow, an expansible fluid chamber forming a part of said system, and mechanical means for expanding and contracting said chamber upon shifting of said element whereby the pressure developed in said system is progressively increased or decreased depending on the position of said element.

8. In a machine driven by a variable speed transmission having a back and forth shiftable speed changing element, means for automatically shifting said element to maintain substantially constant speed of said machine under varying conditions of work, comprising a servo-motor connected to and for positively shifting said element, pipe means for introducing fluid under pressure to said servo-motor for operating the same, a pilot valve controlling flow of fluid in said pipe means, a self-contained liquid pressure system having a fixed quantity of liquid under pressure therein extending from said machine, means for controlling said pilot valve in response to varying pressure in said liquid pressure system, and means varying the pressure in said system in reponse to back and forth movement of said element.

HUGH J. BYRNE.